(12) United States Patent
Mayfield et al.

(10) Patent No.: US 6,915,415 B2
(45) Date of Patent: Jul. 5, 2005

(54) METHOD AND APPARATUS FOR MAPPING SOFTWARE PREFETCH INSTRUCTIONS TO HARDWARE PREFETCH LOGIC

(75) Inventors: Michael John Mayfield, Austin, TX (US); Francis Patrick O'Connell, Austin, TX (US); David Scott Ray, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 10/042,102

(22) Filed: Jan. 7, 2002

(65) Prior Publication Data

US 2003/0131218 A1 Jul. 10, 2003

(51) Int. Cl.[7] ................................................ G06F 9/30
(52) U.S. Cl. ........................ 712/225; 712/205; 711/137
(58) Field of Search ................................ 712/225, 205, 712/206, 207; 711/137

(56) References Cited

U.S. PATENT DOCUMENTS

| | | | | |
|---|---|---|---|---|
| 5,838,945 A | * | 11/1998 | Emberson | 712/200 |
| 6,012,134 A | * | 1/2000 | McInerney et al. | 711/207 |
| 6,073,215 A | * | 6/2000 | Snyder | 711/137 |
| 6,202,130 B1 | * | 3/2001 | Scales et al. | 711/137 |
| 6,311,260 B1 | * | 10/2001 | Stone et al. | 711/213 |

* cited by examiner

*Primary Examiner*—Henry W. H. Tsai
(74) *Attorney, Agent, or Firm*—Carr LLP; Robert M. Carwell

(57) ABSTRACT

A method and apparatus for mapping some software prefetch instructions in a microprocessor system to a modified set of hardware prefetch instructions and executing the software prefetch by invoking the corresponding modified hardware prefetch instruction. For common software prefetch access patterns, by mapping the software prefetches to hardware, improved prefetching can be achieved without the need for additional hardware.

25 Claims, 3 Drawing Sheets

METHOD AND APPARATUS FOR MAPPING SOFTWARE PREFETCH INSTRUCTIONS TO HARDWARE PREFETCH LOGIC

BACKGROUND

The continuing development of computer systems has resulted in efforts to increase performance and maximize efficiency of the computer systems. One solution to this problem has been the creation and utilization of cache systems in a computer. The purpose of a cache system is to bring the speed of accessing computer system memory as close as possible to the speed of the central processing unit (CPU) itself. By making instructions and data available to the CPU at a rapid rate, it is possible to increase the performance rate of the processor. A cache system has access time that approaches that of CPU components, and is often 5 to 10 times faster than the access time of main memory components. When the CPU makes a data request, the data can be found in one of the processor caches, main memory, or in a physical storage system (such as a hard disk). Each level consists of progressively slower components. There are usually several levels of cache. The L1 cache, which usually exists on the CPU, is the smallest in size. The larger L2 cache (second-level cache) may also be on the CPU or be implemented off the CPU with SRAM. Main memory is much larger and consists of DRAM, and the physical storage system is much larger again but is also much, much slower than the other storage areas. Cache memories are fast memory storage devices. A cache system increases the performance of a computer system by predicting what data will be requested next and having that data already stored in the cache, thus speeding execution. The data search begins in the L1 cache, then moves out to the L2 cache, then to DRAM, and then to physical storage.

A process known as "prefetching" is known in the art. Prefetching is used to supply memory data to the CPU caches ahead of time to reduce microprocessor access time. By fetching data from a slower storage system and placing it in a faster access location, such as the L1 or L2 cache, the data can be retrieved more quickly. Ideally, a system would prefetch the data and instructions that will be needed next far enough in advance that a copy of the data that will be needed by the CPU would always be in the L1 cache when the CPU needed it. However, prefetching involves a speculative retrieval of data that is anticipated to be needed by the microprocessor in subsequent cycles. Data prefetch mechanisms can be software controlled by means of software instructions, or hardware controlled, using pattern detection hardware. Each of these prefetch mechanisms has certain limitations.

Software prefetch mechanisms typically use instructions such as Data Stream Touch (DST) to prefetch a block of data. Once the prefetch is started by the software command, hardware is used to prefetch the entire block of data into the cache. If the block of data fetched is large relative to the size of the L1 cache, it is probable that data currently being used by the CPU will be displaced from the L1 cache. The needed displaced lines will have to be refetched by the CPU, resulting in slower performance. In addition, software prefetch instructions may generate access patterns which do not efficiently use caches when prefetching larger lines, such as 128 bytes. For example, a DST instruction can specify a starting address, a block size (1 to 32 vectors, where a vector is 16 bytes), a number of blocks to prefetch (1 to 256 blocks), and a signed stride in bytes (−32768 to +32768). An access pattern which specifies blocks which span cache lines and are irregularly spaced, relative to the cache lines, will waste cache space. And, due to the sparse use of the data in the cache line, performance will be lowered. Additionally, large amounts of hardware may required to implement the full scope of the software prefetch instruction.

Hardware mechanisms prefetch a stream of data and generally can be designed to only prefetch as far ahead as the cache and memories require. Because hardware mechanisms detect a stream, the stream logic has to generate enough prefetches to get the designated number of lines ahead of the actual processor accesses. Once the hardware is far enough ahead, the lines are prefetches at the rate at which the processor consumes them. Often, however, especially when a hardware prefetch is first started, there is a delay in the prefetch process, because the hardware has to detect the access pattern before it can start prefetching. Additionally, if the hardware does not know the length of the access pattern, it can fetch beyond the end of the required data block. These inefficiencies are amplified when the data stream being prefetched is a short stream. The wasted memory bandwidth due to unused fetches becomes a larger problem in systems that prefetch data from a plurality of L1 and L2 caches, as is becoming more common in larger, faster systems having multiple processors.

Therefore, what is needed is a system and method of efficiently utilizing prefetch logic so as to maximize CPU performance without requiring additional hardware.

SUMMARY

The present invention, accordingly, provides a method and apparatus for more efficiently utilizing software prefetch mechanisms by mapping a subset of the software prefetch instructions to a modified version of the hardware prefetch mechanism. The set of software prefetch instructions not supported are ignored.

One aspect of the present invention is a method for efficiently utilizing resources in a data processing system employing software and hardware data prefetching instruction mechanisms, that comprises mapping a subset of the software prefetch instructions to a modified version of the hardware prefetch mechanism, and executing a software prefetch instruction within the subset of included software prefetch instructions by invoking the appropriate modified hardware prefetch mechanism.

By restricting the software prefetch instruction mapping to cases which map well to the CPU caches, the prefetch instructions providing the best cache performance are selected for mapping, and the hardware required to do the mapping is reduced. In addition, since the software prefetch instructions specify the prefetch range, there is no performance loss due to start-up delays or extra fetches past the end of the range, as there would be with a hardware prefetch mechanism alone.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
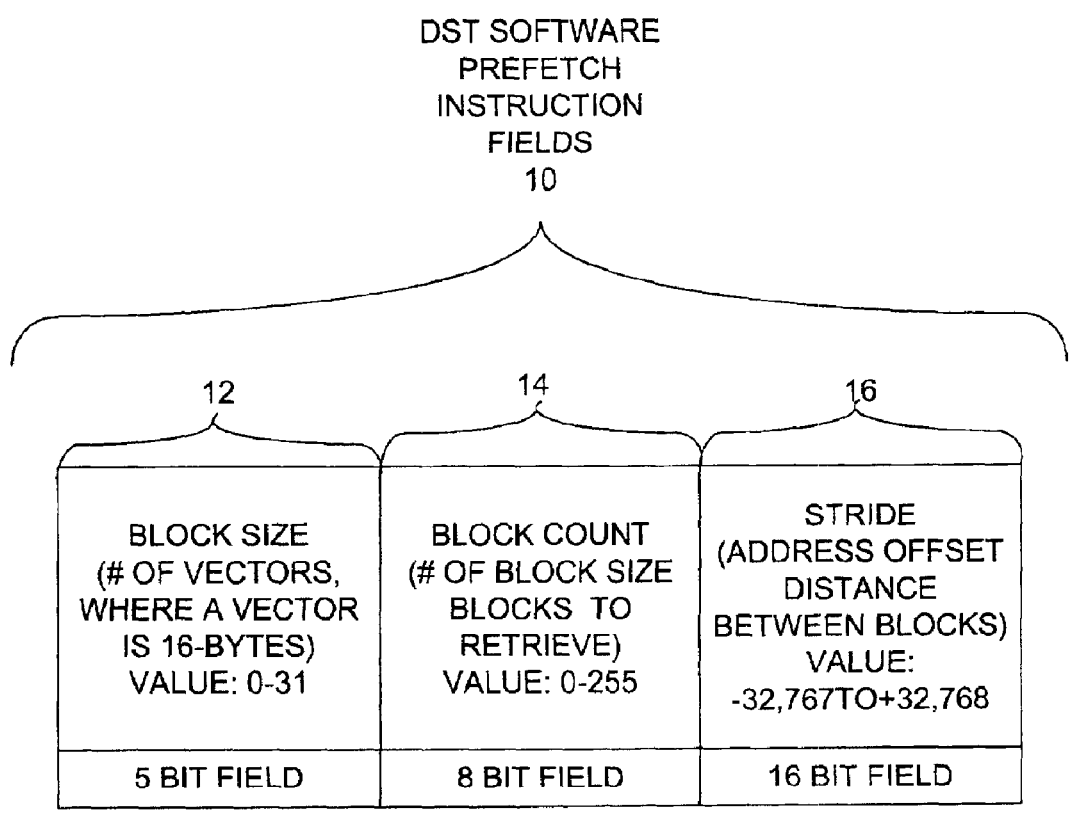
FIG. 1 is a schematic diagram of the fields of a software prefetch instruction.

In the discussion of the FIGURES, the same reference numerals will be used throughout to refer to the same or similar components. In the interest of conciseness, various other components known to the art, such as computer processing equipment, data entry mechanisms, and the like necessary for the operation of the invention, have not been shown or discussed.

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail.

The preferred embodiment of the present invention operates on a VMX architecture platform. VMX architecture uses data stream touch (DST) software instructions to control software prefetch mechanisms. The DST instruction specifies a register containing the starting address, and another register containing fields specifying the access pattern. As shown in FIG. 1, the register specifying the access pattern 10 preferably includes a plurality of fields, including the fields BLOCK SIZE 12, BLOCK COUNT 14, and STRIDE 16. BLOCK SIZE 12 is the number of vectors (each bector being 16 bytes) to be retrieved per block for each memory block of the data stream being retrieved from memory. BLOCK COUNT 14 is the number of blocks, each of a size equal to BLOCK SIZE 12 that will make up the data stream prefetched by an instruction. STRIDE 16 is the address offset or distance between each block of the data stream, or the amount the previous address is incremented (or decremented) by to obtain the next address.

An analysis performed of VMX software prefetches revealed certain software prefetch patterns occurred more frequently: The first common pattern was a stream with a BLOCK SIZE of 2 vectors (32 bytes) with a BLOCK COUNT of 1 (STRIDE is not relevant here). The second common pattern was a stream with a BLOCK SIZE of 2 vectors (32 bytes) with a BLOCK COUNT of 8 or 14 and a STRIDE of 32, which is a consecutive access of 2 to 4 lines (for a 128 byte line size CPU). The third common pattern was a stream with a BLOCK SIZE of 2 vectors (32 bytes) with a BLOCK COUNT of 88 or 93 and a STRIDE of 32, which is a consecutive access of 22 to 24 lines. The fourth common pattern was a stream with a BLOCK SIZE of 4 vectors (64 bytes) with a BLOCK COUNT of 64 and a STRIDE of 94, which is a consecutive access of 32 lines. With these common access patterns, hardware controlled prefetching would be likely to miss or be inefficient for fetching of the shorter streams, although most of the longer streams would probably be prefetched. An embodiment of the present invention, by mapping the software prefetches to a modified version of the hardware prefetches, eliminates the need for an additional prefetch mechanism, and the accompanying hardware and expense, while a greater number of access patterns are detected. Any software prefetch instructions that are not supported by an embodiment of the present invention will be ignored by the mapping hardware and not mapped to hardware prefetches.

As further shown in FIG. 1, in the preferred embodiment of the present invention, BLOCK SIZE 12 is a 5-bit field with a value from 0 to 31, allowing from 1 to 32 blocks of vector bytes, with each vector byte being 16 bytes, with a field value of 0 being equated to 32 16-byte blocks. BLOCK COUNT 14 is an eight-bit field with a value from 0 to 255, allowing from 1 to 256 blocks to be fetched, with a value of 0 being equated to 256 blocks. STRIDE 16 is a 16 bit field allowing from −32,767 bytes of stride to +32,768 bytes of stride, with a value of 0 being equated to +32,768 bytes.

Since the all zero value is defined to be the maximum, the 5 bit BLOCK SIZE field must be mapped to a 6-bit size field, $\{Z(0\ to\ 5)\}$, where a BLOCK SIZE of all zeroes maps to Z (0 to 5) equal to '100000'b. Similarly, since the all zero value of BLOCK COUNT is defined to be 256, this field must map to a 9-bit block count field $\{B(0\ to\ 8)\}$, with B(0 to 8) equal to '100000000'b the maximum value of 256. A similar definition problem exists for the STRIDE field. While this is a signed value (the upper bit is the sign bit), the all zero value is defined to be a stride of +32 K bytes. Therefore, a 17-bit STRIDE field must be used in this mapping $\{S(0\ to\ 16)\}$. If the STRIDE field is positive (upper bit is zero), then the value of S is:

0||SIZE, if STRIDE is not all zeroes, OR

0 ||'8000'X if STRIDE is all zeroes.

If the STRIDE field is negative (upper bit one), then the value of S(0 to 16) is the two's complement of the 17 bit field formed by the sign bit ('1'b) concatenated with the entire STRIDE field. This conversion always results in a positive STRIDE, S(0 to 16). The direction of stride is determined by the upper bit of the original STRIDE field, call it STRIDE(0). These derived descriptions of size, block count, and stride (Z, B, and S) are needed to specify the mapping described below.

Figure 2:
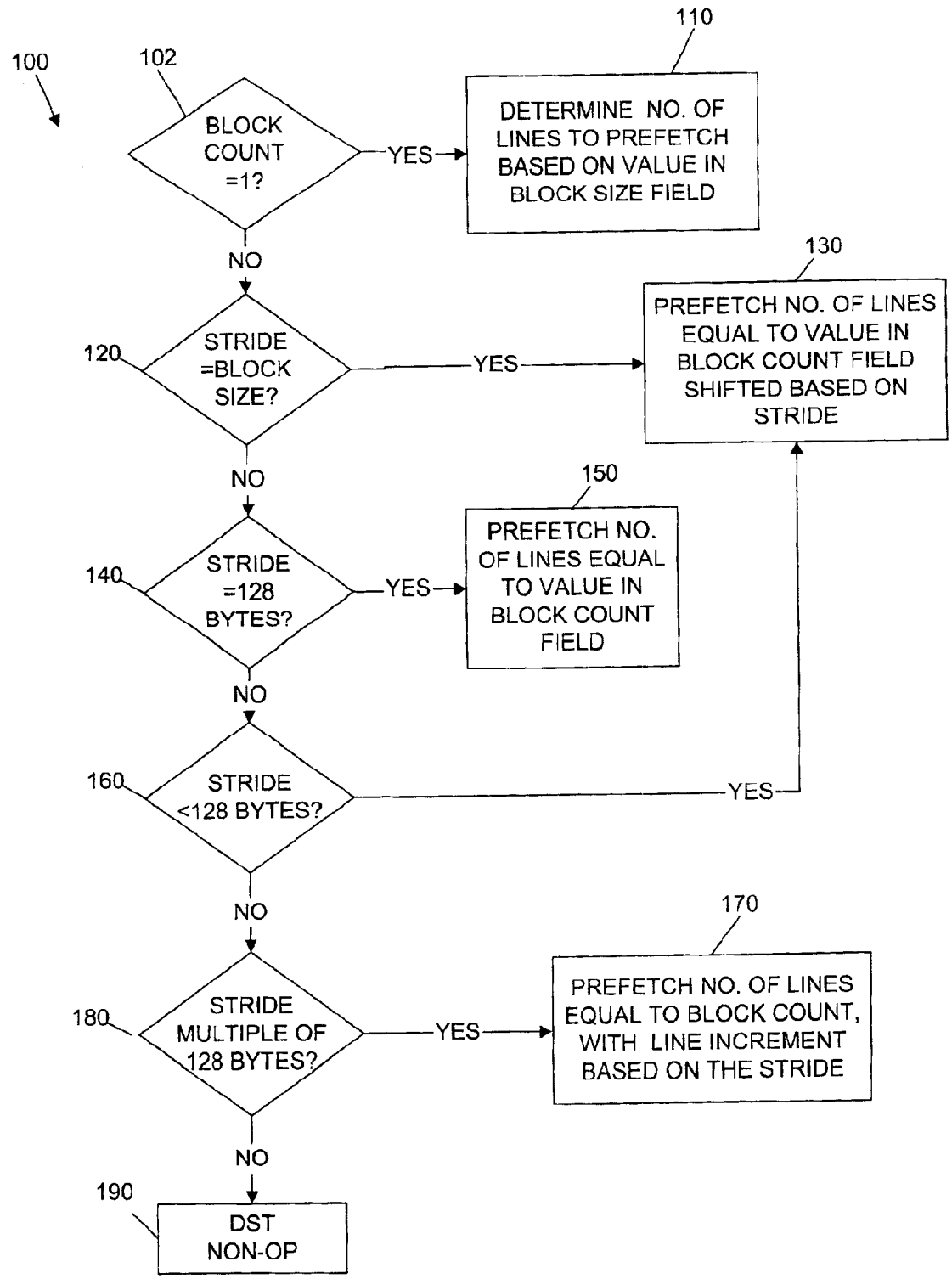
FIG. 2 is a block diagram of the mapping process of the present invention.

FIG. 2 is a formulaic representation 100 of one aspect of the present invention. The first step in the process 102 is to determine the value in the BLOCK COUNT field of the DST prefetch instruction. If the value in the BLOCK COUNT is 1, which equates to the first frequently seen prefetch pattern described above, then at step 110 a determination of the number of lines to prefetch, from 1 to 4, will be based on the value in the BLOCK SIZE field. The value in the STRIDE field is not relevant in this situation because the BLOCK COUNT is 1, and the direction of data fetching will always be in the positive direction. The number of lines to prefetch, from 1 to 4, when the BLOCK COUNT is 1, may be calculated using the following formula:

---
FORMULA 1
Number of Lines to Prefetch:

| | |
|---|---|
| 4 | if BLOCK SIZE (1 to 4) = '0000'b, else |
| Z(1 to 2) | if BLOCK SIZE (3 to 5) = '000'b, else |
| Z(1 to 2) + 1 | |

---

When the BLOCK COUNT is a value at step 102 is other than 1, a determination of the number of lines to be prefetched will be based on the value in the STRIDE field at step 120, 150, 160. These determinations equate to the second through fourth most frequently seen prefetch patterns described above.

In each of these next three cases, the number of lines to prefetch is given by TABLE 1 below. For mapping simplicity, each of the subsequent mappings are only valid if the STRIDE is a multiple of 16 bytes, i.e., S(13 to 16) equals zero.

If the STRIDE equals the size of the data being accessed, the accesses are consecutive:

S(0 to 6)='0000000'b and
S(7 to 12)=Z(0 to 5) and
S(13 to 16)='0000'b

When at step 102 the BLOCK COUNT is a value other than 1, at step 120 if the value of the STRIDE S(0 to 16) and the value of the BLOCK SIZE, Z(0 to 5), match as shown above, then at step 130 the number of lines to prefetch is equal to the value in the BLOCK COUNT field B(0 to 8), shifted based on the STRIDE, S(7 to 12). The shifting of the BLOCK COUNT, based on the STRIDE, is done in accordance with TABLE 1, below. The direction in which the prefetch will be performed from the current location is based on the upper bit of the original STRIDE field, STRIDE(0). If this bit is 0, then the prefetch direction will be positive from the current position, and if this bit is 1, then the prefetch direction will be negative from the current position.

TABLE 1

| STRIDE (7 to 12) | SHIFT BLOCK COUNT B(0 to 8) BY | DIRECTION |
| --- | --- | --- |
| 1 00000 | 2 | left (negative) |
| 0 1xxxx | 1 | left (negative) |
| 0 01xxx | 0 | no shift |
| 0 001xx | 1 | right (positive) |
| 0 001xx | 2 | right (positive) |
| 0 00001 | 3 | right (positive) |

Another case using TABLE 1 occurs, when the BLOCK COUNT is a value other than 1, and the value of the STRIDE at step 140 is 128 bytes; i.e., S(0 to 16) equals '00010'X. In this case, the number of lines to be prefetched at step 150 is equal to the unshifted value of B(0 to 8), as shown by the third entry in TABLE 1, as S(7 to 12) equals '001000'b. The direction is determined, as before, based on STRIDE(0).

A third case using TABLE 1 occurs, when the BLOCK COUNT is a value other than 1, and the value of the STRIDE at step 160 is less than 128 bytes. For this case, the STRIDE is:

S(0 to 6)='0000000'b and
S(7 to 12)='000xxx'b where xxx is non-zero and
S(13 to 16)='0000'b In this case, the number of lines to prefetch at step 130 is equal to the BLOCK COUNT, shifted, based on the STRIDE, to give the number of lines needed. The shifting is done in accordance with TABLE 1, above. As before, the direction is determined based on STRIDE(0).

In one embodiment of the present invention, a case that was not revealed as a frequent software prefetch in the course of analysis encompasses the situation where multiple lines separated by a multiple line STRIDE are prefetched. It was determined that in this situation, by padding the data structures to multiples of the lines size, the function could be used for accessing blocks of less than 128 bytes that have a large STRIDE.

S(0 to 9) is greater than 1 and
S(10 to 12)='000'b and
S(13 to 16)='0000'b

In this case, when the BLOCK COUNT is a value other than 1, and the value of the STRIDE at step 180 is greater than 128 bytes, i.e. S(0 to 9) is greater than 1, then at step 170, the number of lines to prefetch is equal to the value in the BLOCK COUNT field, which has not been shifted, and the line increment is based on the STRIDE value, specifically S(1 to 9). As before, the direction is determined based on STRIDE(0).

If the BLOCK COUNT and STRIDE do not fall within any of the ranges above, then at step 190 the DST prefetch mechanism does not operate. This mapping hardware will convert all of the VMX DST software prefetch commands that fall with the scope of the above cases into prefetches that can be executed by the prefetch hardware in the system. Once the software instructions have been mapped to the hardware prefetch mechanism, the hardware will prefetch all the lines in the requested block. If none of the mapping conditions apply, then at step 180, the DST is treated as a "no-op" instruction; i.e. it will be ignored.

The following table provides examples of DST software prefetch instructions that are mapped to a modified set of hardware prefetch instructions, using the formulas described above for an embodiment of the present invention. For simplicity, the first column in TABLE 2 shows the number of bytes in the requested block versus the number of 16 bytes vectors that the SIZE field specifies.

TABLE 2

| Number of Bytes in Block | Stride S (0 to 16) | Block Count | Number of 128 Byte Lines | Line Increment | Direction Positive (0) Negative (1) |
| --- | --- | --- | --- | --- | --- |
| 16 | 16 | 8 | 1 | 1 | STRIDE(0) |
| 16 | 32 | 8 | 2 | 1 | STRIDE(0) |
| 16 | 32 | 12 | 3 | 1 | STRIDE(0) |
| 16 | 32 | 16 | 4 | 1 | STRIDE(0) |
| 32 | 64 | 14 | 7 | 1 | STRIDE(0) |
| 64 | 64 | 64 | 32 | 1 | STRIDE(0) |
| 512 | 512 | 8 | 32 | 1 | STRIDE(0) |
| 256 | don't care | 1 | 2 | 1 | 0 |
| 272 | don't care | 1 | 3 | 1 | 0 |
| 64 | 128 | 12 | 12 | 1 | STRIDE(0) |
| 64 | 512 | 8 | 8 | 4 | STRIDE(0) |

Figure 3:
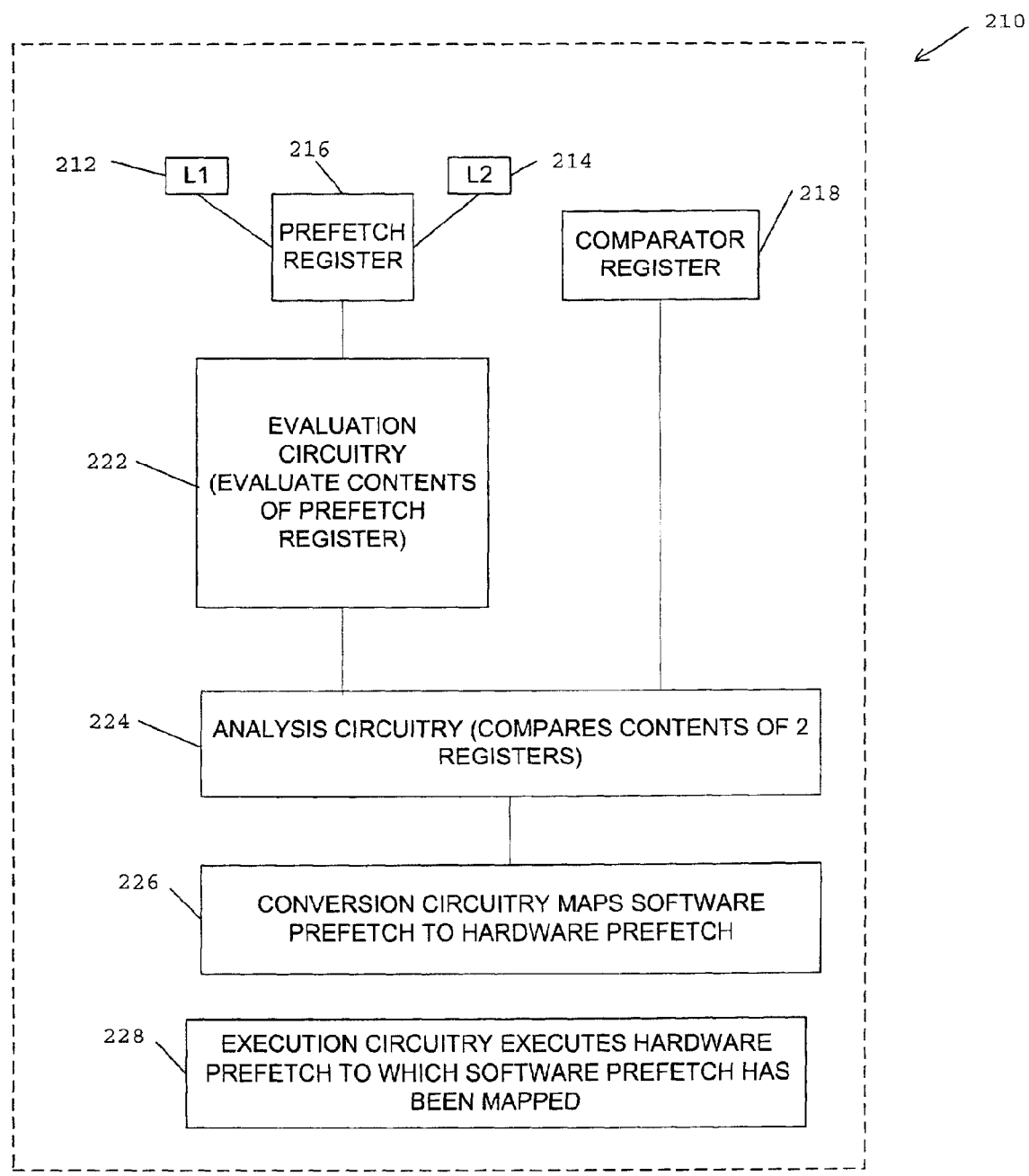
FIG. 3 depicts, in block diagram form, a preferred sequence of events which transpire in the microprocessor of the present invention.

FIG. 3 depicts a microprocessor 210 that forms the central portion of a system used for processing information in accordance with a preferred embodiment of the present invention. In the depicted embodiment, the microprocessor 210 comprises a variety of execution units, registers, buffers, memories and other units, which are all formed by integrated circuitry, that are used to perform the functions of the system. The microprocessor 210 comprises at least one L1 cache 212 and at least one L2 cache 214. A register 216 stores information about the block of data to be prefetched. A comparator register 218 stores information about the range of data block values that are to be mapped from software prefetch instructions to modified hardware prefetch instructions. The evaluation circuitry 222 determines the value for each of the parameters stored in the register 216. Analysis circuitry 224 compares the data obtained by the evaluation circuitry 222 and determines if the current data block is within the range of values stored in the comparator register 218. The analysis circuitry 224, upon determination that the data block currently stored in the register 216 falls within the range of values stored within the comparator register 218, sends a message to the conversion circuitry 226 to map the software prefetch instruction to a hardware prefetch instruction. The system also contains execution circuitry 228 that invokes the hardware prefetch mechanism in order for it to perform the software prefetch instruction.

It is understood that the present invention can take many forms and embodiments. Accordingly, several variations may be made in the foregoing without departing from the spirit or the scope of the invention. For example, the lines prefetched can be loaded to any of the CPU's cache levels. Also, the method described applies to a CPU with a cache line size of 128 bytes, but is easily adapted to any other size.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for efficiently utilizing resources in a data processing system employing software and hardware data prefetching instruction mechanisms, the method comprising:
   a) determining a value of a Stride field if Block Count field is not 1;
   b) mapping a subset of the software prefetch instructions to a modified version of the hardware prefetch mechanism if the Stride Field is within a specified parameter or if the Block Count field is 1; and
   c) executing a software prefetch instruction within the subset of included software prefetch instructions by invoking the modified hardware prefetch mechanism.

2. The method of claim 1 wherein the software prefetch instructions are Data Stream Touch (DST) instructions.

3. The method of claim 1 wherein the hardware prefetch mechanism is a part of a VMX system architecture.

4. A method of operating a data processing system in response to a software prefetch instruction, the method comprising:
   a) decoding the software prefetch instruction;
   b) responsive to the decoding, determining whether a value of a Stride field of the software prefetch instruction is within a set of predetermined values for each field within the instruction if Block Count field of the software prefetch instruction is not 1;
   c) if fields of the Stride field or Block Count field of the software prefetch instruction are within the set of predetermined values, mapping the decoded software prefetch instruction to a hardware prefetch mechanism; and
   d) invoking the hardware prefetch mechanism to perform the software prefetch instruction.

5. The method of claim 4 wherein the software prefetch instructions are Data Stream Touch (DST) instructions.

6. The method of claim 4 wherein the hardware prefetch mechanism is a part of a VMX system architecture.

7. A method for mapping a subset of software prefetch instructions, each software prefetch instruction comprising a Block Count field, a Block Size field and a Stride field, to a modified version of a hardware prefetch mechanism, the method comprising:
   a) determining the value in the Block Count field in the software prefetch instruction;
   b) if a value in the Block Count field is 1, mapping the software prefetch instruction for a number of lines obtained by the value in the Block Size field, to the modified hardware prefetch mechanism;
   c) if the value in the Block Count field is not 1, determining a value in the Stride field;
   d) responsive to step c), if the value in the Stride field representing a number of bytes is equal to a value in the Block Size field, mapping the software prefetch instruction for a number of lines of data equal to the value in the Block Count field, shifted based on the value in the Stride field to the modified hardware prefetch mechanism;
   e) responsive to step c), if the value in the Stride field representing the number of bytes is 128, mapping the software prefetch instruction for a number of lines of data equal to the value in the Block Count field to the modified hardware prefetch mechanism;
   f) responsive to step c), if the value in the Stride field representing the number of bytes is less than 128, mapping the software prefetch instruction for a number of lines of data equal to the value in the Block Count field, shifted based on the value in the Stride field to the modified hardware prefetch mechanism;
   g) responsive to step c), if the value in the Stride field representing the number of bytes is greater than 128, mapping the software prefetch instruction for a number of lines of data equal to the value in the Block Count field, shifted based on the value in the Stride field, with a line increment count that is a line multiple based on the value in the Stride field to the modified hardware prefetch mechanism; and
   h) means for precluding mapping the software prefetch instructions to the modified hardware prefetch mechanism if the values in said fields of software prefetch instructions are not within the values specified in steps a through g.

8. The method of claim 7 wherein the software prefetch instructions are Data Stream Touch (DST) instructions.

9. The method of claim 7 wherein the hardware prefetch mechanism is a part of a VMX system architecture.

10. The method of claim 7 wherein when the value in the Block Count field is 1, prefetching 4 lines of data if the value in the Block Size field is '0000'b, prefetching a number of lines equal to a block size of Z(1 to 2) if the value in the Block Size field is '000'b, and prefetching a number of lines equal to a block size of Z(1 to 2)+1 for any other value in the Block Size field.

11. The method of claim 7 wherein when the value in the Block Count field is not 1, and the value in the Stride field is equal to the value in the Block Size field, shifting the value in the Block Count so that when the value in bits 7 through 12 of the Stride field is 1 00000, the Block Count is shifted to the left by 2, when the value in bits 7 through 12 of the Stride field is 0 1xxxx, the Block Count is shifted to the left by 1, when the value in bits 7 through 12 of the Stride field is 0 01xxx, the Block Count is not shifted, when the value in bits 7 through 12 of the Stride field is 0 001xx, the Block Count is shifted to the right by 1, when the value in bits 7 through 12 of the Stride field is 0 001xx, the Block Count is shifted to the right by 2, and when the value in bits 7 through 12 of the Stride field is 0 00001, the Block Count is shifted to the right by 3.

12. The method of claim 7 wherein when the value in the Block Count field is not 1, and the value in the Stride field is less than 128 bytes, shifting the value in the Block Count so that when the value in bits 7 through 12 of the Stride field is 1 00000, the Block Count is shifted to the left by 2, when the value in bits 7 through 12 of the Stride field is 0 1xxxx, the Block Count is shifted to the left by 1, when the value in bits 7 through 12 of the Stride field is 0 01xxx, the Block Count is not shifted, when the value in bits 7 through 12 of the Stride field is 0 001xx, the Block Count is shifted to the right by 1, when the value in bits 7 through 12 of the Stride field is 0 001xx, the Block Count is shifted to the right by 2, and when the value in bits 7 through 12 of the Stride field is 0 00001, the Block Count is shifted to the right by 3.

13. An apparatus for executing data prefetch instructions in a computer system having a memory, the apparatus comprising:
  a) a set of software prefetch instruction field parameters comprising Block Count, Block Size and Stride parameters stored in the memory of the computer system;
  b) a range of predetermined comparison values for Block Count, Block Size and Stride field parameters stored in the memory of the computer system;
  c) means for decoding the software prefetch instruction fields;
  d) means for comparing the values in the Block Count, Block Size, and Stride fields of the software prefetch instruction to the set of predetermined comparison values for the Block Count, Block Size, and Stride fields;
  e) means for mapping the decoded software prefetch instruction to a hardware prefetch mechanism if the Block Count field Parameter is 1 or if the values of the Stride field Parameters are within the set of predetermined comparison values; and
  f) means for invoking the hardware prefetch mechanism to perform the software prefetch instruction.

14. The apparatus of claim 12 wherein the software prefetch instructions stored in the memory of the computer are Data Stream Touch (DST) instructions.

15. The apparatus of claim 12 wherein the hardware prefetch mechanism is a VMX system architecture mechanism.

16. An apparatus for executing data prefetch instructions in a computer system having a memory, the apparatus comprising:
  a) a set of software prefetch instruction fields parameters stored in the memory of the computer, comprising a Block Count field, a Block Size field and a Stride field;
  b) means for determining a value in the Block Count field in the software prefetch instruction;
  c) means for mapping the software prefetch instruction fields for a number lines of data based on a value in the Block Size field, to a modified hardware prefetch mechanism, if the Block Count value is 1;
  d) means for determining a value in the Stride field if the value in the Block Count field is not 1;
  e) means for mapping the software prefetch instruction for a number of lines of data equal to the value in the Block Count field, shifted based on the value in the Stride field to the modified hardware prefetch mechanism, if the value in the Stride field representing the number of bytes is equal to the value in the Block Size field;
  f) means for mapping the software prefetch instruction for a number of lines of data equal to the value in the Block Count field to the modified hardware prefetch mechanism, if the value in the Stride field representing the number of bytes is 128;
  g) means for mapping the software prefetch instruction for a number of lines of data equal to the value in the Block Count field, shifted based on the value in the Stride field to the modified hardware prefetch mechanism, if the value in the Stride field representing the number of bytes is less than 128;
  h) means for mapping the software prefetch instruction for a number of lines of data equal to the value in the Block Count field, shifted based on the value in the Stride field, with a line increment count that is a line multiple based on the value in the Stride field to the modified hardware prefetch mechanism, if the value in the Stride field representing the number of bytes is greater than 128; and
  i) means for precluding mapping the software prefetch instructions to the modified hardware prefetch mechanism if the software prefetch instructions field narameters are not within the values specified in steps b through h.

17. The apparatus of claim 16 wherein the software prefetch instructions are Data Stream Touch (DST) instructions.

18. The apparatus of claim 16 wherein the hardware prefetch mechanism is a part of a VMX system architecture.

19. The apparatus of claim 16 wherein when the value in the Block Count field is 1, prefetching 4 lines of data if the value in the Block Size field is '0000'b, prefetching a number of lines equal to Z(1 to 2) if the value in the Block Size field is '000'b, and prefetching a number of lines equal to Z(1 to 2)for any other value in the Block Size field.

20. The apparatus of claim 16 wherein when the value in the Block Count field is not 1, and the value in the Stride field is equal to the value in the Block Size field, shifting the value in the Block Count so that when the value in bits 7 through 12 of the Stride field is 1 00000, the Block Count is shifted to the left by 2, when the value in bits 7 through 12 of the Stride field is 0 1xxxx, the Block Count is shifted to the left by 1, when the value in bits 7 through 12 of the Stride field is 0 01xxx, the Block Count is not shifted, when the value in bits 7 through 12 of the Stride field is 0 001xx, the Block Count is shifted to the right by 1, when the value in bits 7 through 12 of the Stride field is 0 001xx, the Block Count is shifted to the right by 2, and when the value in bits 7 through 12 of the Stride field is 0 00001, the Block Count is shifted to the right by 3.

21. The apparatus of claim 16 wherein when the value in the Block Count field is not 1, and the value in the Stride field is less than 128 bytes, shifting the value in the Block Count so that when the value in bits 7 through 12 of the Stride field is 1 00000, the Block Count is shifted to the left by 2, when the value in bits 7 through 12 of the Stride field is 0 1xxxx, the Block Count is shifted to the left by 1, when the value in bits 7 through 12 of the Stride field is 0 001xxx, the Block Count is not shifted, when the value in bits 7 through 12 of the Stride field is 0 001xx, the Block Count is shifted to the right by 1, when the value in bits 7 through 12 of the Stride field is 0 001xx, the Block Count is shifted to the right by 2, and when the value in bits 7 through 12 of the Stride field is 0 00001, the Block Count is shifted to the right by 3.

22. A computer program product for translating computer software data prefetch instructions to computer hardware data prefetch instructions, the computer program product comprising:
  a) computer program code for determining values in a Block Count field, a Block Size field and a Stride field of the computer software data prefetch instructions;

b) computer program code for determining if the value in the Block Count field is 1, and then mapping the software prefetch instruction for a number of lines of data based on the value in the Block Size field, to a modified hardware prefetch mechanism;

c) computer program code for determining the value in the Stride field if the value in the Block Count field is not 1;

d) computer program code for mapping the software prefetch instruction for a number of lines of data equal to the value in the Block Count field, shifted based on the value in the Stride field to the modified hardware prefetch mechanism, if the value in the Stride field representing the number of bytes is equal to the value in the Block Size field;

e) computer program code for mapping the software prefetch instruction for a number of lines of data equal to the value in the Block Count field to the modified hardware prefetch mechanism, if the value in the Stride field representing the number of bytes is 128;

f) computer program code for mapping the software prefetch instruction for a number of lines of data equal to the value in the Block Count field, shifted based on the value in the Stride field to the modified hardware prefetch mechanism, if the value in the Stride field representing the number of bytes is less than 128;

g) computer program code for mapping the software prefetch instruction for a number of lines of data equal to the value in the Block Count field, shifted based on the value in the Stride field, with a line increment count that is a line multiple based on the value in the Stride field to the modified hardware prefetch mechanism, if the value in the Stride field representing the number of bytes is greater than 128; and h) computer program code for precluding mapping the software prefetch instructions to the modified hardware prefetch mechanism if the software prefetch instruction field parameters are not within the values specified in steps b through g.

23. The computer program product of claim 22 wherein when the value in the Block Count field is 1, prefetching 4 lines of data if the value in the Block Size field is '0000'b, prefetching a number of lines equal to a block size of Z(1 to 2) if the value in the Block Size field is '000'b, and prefetching a number of lines equal to a block size of Z(1 to 2)+1 for any other value in the Block Size field.

24. The computer program product of claim 22 wherein when the value in the Block Count field is not 1, and the value in the Stride field is equal to the value in the Block Size field, shifting the value in the Block Count so that when the value in bits 7 through 12 of the Stride field is 1 00000, the Block Count is shifted to the left by 2, when the value in bits 7 through 12 of the Stride field is 0 1xxxx, the Block Count is shifted to the left by 1, when the value in bits 7 through 12 of the Stride field is 0 01xxx, the Block Count is not shifted, when the value in hits 7 through 12 of the Stride field is 0 001xx, the Block Count is shifted to the right by 1, when the value in bits 7 through 12 of the Stride field is 0 001xx, the Block Count is shifted to the right by 2, and when the value in bits 7 through 12 of the Stride field is 0 00001, the Block Count is shifted to the right by 3.

25. The computer program product of claim 22 wherein when the value in the Block Count field is not 1, and the value in the Stride field is less than 128 bytes, shifting the value in the Block Count so that when the value in bits 7 through 12 of the Stride field is 1 00000, the Block Count is shifted to the left by 2, when the value in bits 7 through 12 of the Stride field is 0 1xxxx, the Block Count is shifted to the left by 1, when the value in bits 7 through 12 of the Stride field is 0 01xxx, the Block Count is not shifted, when the value in bits 7 through 12 of the Stride field is 0 001xx, the Block Count is shifted to the right by 1, when the value in bits 7 through 12 of the Stride field is 0 001xx, the Block Count is shifted to the right by 2, and when the value in bits 7 through 12 of the Stride field is 0 00001, the Block Count is shifted to the right by 3.

* * * * *

UNITED STATES PATENT AND TRADEMARK OFFICE
CERTIFICATE OF CORRECTION

PATENT NO. : 6,915,415 B2
DATED : July 5, 2005
INVENTOR(S) : Michael John Mayfield, Francis Patrick O'Connell and David Scott Ray It is certified that error appears in the above-identified patent and that said Letters Patent is hereby corrected as shown below:

Column 7,
Line 32, before "software" delete "the".

Column 9,
Line 16, delete "software prefetch instruction field parameter" and insert -- fields in each of software prefetch instructions --.
Line 17, after "Stride" insert -- field --.
Lines 36 and 39, delete "12" and insert -- 13 --.
Line 45, delete "software prefetch instruction fields parameter" and insert -- fields in each of software prefetch instructions --.

Column 10,
Line 17, delete "field narameters" and insert -- fields --.
Line 29, delete "Z(1 to 2)" and insert -- Z(1 to 2)+1 --.
Line 61, after "product" insert -- stored in a computer readable medium --.

Column 11,
Lines 3, 9, 16, 21, 27 and 36, after "software" insert -- data --.
Line 38, delete "field parameters" and insert -- fields --.

Signed and Sealed this

Twenty-fifth Day of October, 2005

JON W. DUDAS
*Director of the United States Patent and Trademark Office*